(12) United States Patent
Yabugaki

(10) Patent No.: US 6,697,011 B2
(45) Date of Patent: Feb. 24, 2004

(54) DOPPLER RADAR DEVICE

(75) Inventor: Yoshiyuki Yabugaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/163,511

(22) Filed: Jun. 7, 2002

(65) Prior Publication Data

US 2003/0174087 A1 Sep. 18, 2003

(30) Foreign Application Priority Data

Mar. 12, 2002 (JP) ........................................ 2002-066920

(51) Int. Cl.[7] .............................. G01S 7/28; G01S 13/95
(52) U.S. Cl. ........................ 342/82; 342/88; 342/200; 342/202; 342/26
(58) Field of Search .............................. 342/26, 82, 88, 342/91, 94–96, 199–202

(56) References Cited

U.S. PATENT DOCUMENTS

| 6,097,329 A | * | 8/2000 | Wakayama | ............... | 342/26 |
| 6,130,636 A | * | 10/2000 | Severwright | ............... | 342/120 |
| 6,317,074 B1 | * | 11/2001 | Johnson | ............... | 342/82 |
| 6,429,807 B2 | * | 8/2002 | Shiratori et al. | ............ | 342/173 |

* cited by examiner

Primary Examiner—Thomas H. Tarcza
Assistant Examiner—Isam Alsomiri
(74) Attorney, Agent, or Firm—Oblon, Spivak, McClelland, Maier & Neustadt, P.C.

(57) ABSTRACT

A doppler radar device having comparing means 142 for comparing the level of pulse signal to be transmitted, sampled through a burst gate, with a predetermined threshold value and search means 143 for changing a set position of the gate, wherein a timing of oscillating the pulse signal is monitored and tracked to fix "range 0" by shifting a timing for triggering transmission of the pulse signal in consideration of a deviation of the timing of oscillating the pulse signal and a jitter value.

6 Claims, 12 Drawing Sheets

DOPPLER RADAR DEVICE

BACKGROUND OF THE INVENTION

1. Field of the Invention

The present invention relates to a doppler radar device used for various meteorological observations, in particular to a doppler radar device using a magnetron as a transmitting tube.

2. Description of Background Art

A burst signal detector circuit of a doppler radar device using a magnetron as a transmitting tube according to a conventional technique is illustrated in FIG. 11. In FIG. 11, numerical reference 410 designates an aerial antenna; numerical reference 420 designates a transmitter; numerical reference 421 designates a magnetron; numerical reference 422 designates a modulator; numerical reference 431 designates a directional coupler; numerical reference 432 designates a circulator; and numerical reference 440 designates a signal processing unit. Numerical reference 441 designates a burst signal detector circuit including a burst gate circuit 141 and automatic frequency control (AFC) 144. Numerical reference 442 designates a trigger generating circuit; and numerical reference 450 designates a receiver including stable local oscillator (hereinbelow referred to as an STALO) 451 and mixer 452.

Next, its operation will be described. In synchronism with a transmitting trigger outputted from trigger generating circuit 442, magnetron 421 oscillates by receiving an electric current supplied from modulator 422. Thus generated transmitted pulse passes through directional coupler 431 and circulator 432 and is emitted from aerial antenna 410. The transmitted pulse reflected by an object is again received by aerial antenna 410, passes through circulator 432, and becomes a received signal. On the other hand, a part of the transmitted pulse is taken out by directional coupler 431, the frequency and phase of the received signal are detected in AFC 144 using the transmitted pulse, generated in a burst gate of burst signal detector circuit 441, and the frequency of magnetron 421 and the frequency of stable local oscillator 451 for mixing are controlled. The received signal is mixed with an output signal from stable local oscillator 451 by mixer 452, and thereafter the mixed is subjected to a phase detection.

FIG. 12 illustrates a control flow of a meteorologic doppler radar using the conventional magnetron illustrated in FIG. 11. A part of pulse to be transmitted, generated by magnetron 421, is divided by directional coupler 431 and received by burst gate 141 in Step 121. In Step 122, it is checked whether or not the divided part is generated in the burst gate, of which temporal position is set in advance. When the pulse to be transmitted is transmitted at normal timing, the transmission frequency and the phase difference are detected by AFC 144, magnetron 421 and stable local oscillator 451 are controlled, observation is started, and data are outputted from the signal processing unit in Steps 123 and 124. In Step 125, when the part is generated outside the burst gate, observation is held on until the operation of magnetron 421 is stabilized and the part is generated in the burst gate. Thereafter, in Steps 124 and 122, observation is started.

In the conventional meteorological doppler radar device using the magnetron as the transmitting tube, a timing of oscillation of the pulse to be transmitted may largely deviate and be generated outside a fixed range of the burst gate because a characteristic of the modulator is affected by the magnetron when a power source is thrown in. Therefore, there are cases that the transmitted pulse is not detected and that the frequency of the magnetron and the stable local oscillator are not normally controlled, whereby an actual application to the meteorological doppler radar is spoiled. Accordingly, it is necessary to wait for observation until timing of transmission is stabilized within the fixed range of burst gate.

Further, when the timing of oscillation of the transmitted pulse deviates or is not stabilized by jitter, "range 0" in a system, i.e. a reference time for timing of transmission being a reference timing for observation by radar, deviates, whereby accurate timing can not be measured.

SUMMARY OF THE INVENTION

It is an object of the present invention to solve the above-mentioned problems inherent in the conventional technique and to provide a doppler radar device which enables a full-time stable application of a system using a conventional magnetron and a conventional modulator and meteorological observations under various conditions.

According to a first aspect of the present invention, there is provided a doppler radar device comprising: a transmitter for generating a pulse signal to be transmitted; a coupling means for dividing the pulse signal and outputting a part of the pulse signal; a gate means for extracting the outputted part of the pulse signal by filtering through a gate having a predetermined time period; a comparing means for comparing the level of the pulse signal extracted through the gate with a predetermined threshold value; and a searching means for changing a set position of the gate in the gate means based on the result of the comparison, whereby advantages that a system including the doppler radar device is constantly operated under a stable condition even though the conventional magnetron and modulator are used and meteorological observations are enabled under any circumstances, for example, in a time range where a transmitted pulse is unstable by throwing a power source in.

According to a second aspect of the present invention, there is provided the doppler radar device, wherein the transmitted pulse signal is sampled within the predetermined time period in the gate, and a position of the transmitted pulse signal is calculated using the sampling data, whereby the advantages described in the first aspect are obtainable.

According to a third aspect of the present invention, there is provided the doppler radar device, wherein a predetermined gate set range is provided in the searching means, and the set position of the gate is changed within the predetermined gate set range, whereby the advantages described in the first aspect are obtainable.

According to a fourth aspect of the present invention, there is provided the doppler radar device, wherein the transmitted pulse signal is tracked using of a plurality of sampling data obtained in the searching means, whereby the advantages described in the first aspect are obtainable.

According to a fifth aspect of the present invention, there is provided the doppler radar device, wherein an HUNT circuit for manually or automatically moving the set position of the gate outside the predetermined gate set range, whereby the advantages described in the first aspect are obtainable.

According to a sixth aspect of the present invention, there is provided the doppler radar device, wherein the gate is moved to a gate transfer position, registered in advance, by the HUNT circuit, whereby the advantages described in the first aspect are obtainable.

BRIEF DESCRIPTION OF THE DRAWINGS

A more complete appreciation of the invention and many of the attendant advantages thereof will be readily obtained as the same becomes better understood by reference to the following detailed description when considered in connection with the accompanied drawings, wherein.

DETAILED DESCRIPTION OF THE PREFERRED EMBODIMENTS

A detailed explanation will be given of preferred embodiments of the present invention in reference to FIGS. 1 through 12 as follows, wherein the same numerical references are used for the same or similar portions and descriptions of these portions is omitted.

In the present invention, in order to solve the above-mentioned problems, a trigger timing is shifted in response to a deviation of oscillating timing of pulse to be transmitted and a jitter value, a pulse is constantly monitored to fix "range 0" of a system, the oscillating timing of the pulse is tracked within a set range of burst gate, and further an HUNT circuit is added, whereby even in a case where the oscillating timing of the pulse extremely deviates from the range of the set burst gate, the pulse can be tracked to a large extent by transferring the burst gate to a position where the transmitted pulse is actually oscillated for constantly generating the pulse within the range of the set burst gate.

Embodiment 1

Figure 1:
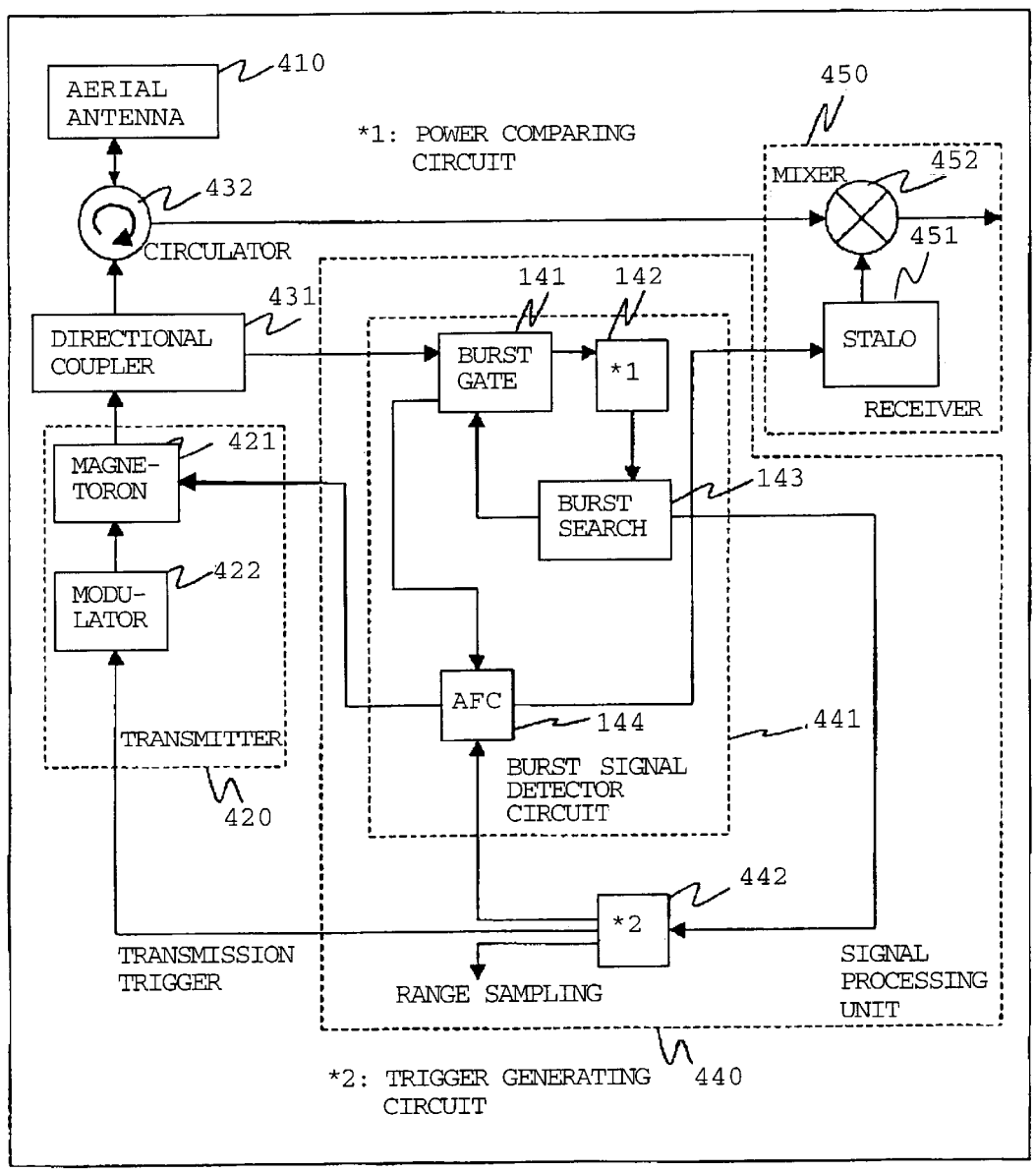
FIG. 1 is a block diagram for illustrating Embodiment 1 of the present invention.

Hereinbelow, Embodiment 1 of the present invention will be described in reference of the figures. In FIG. 1, numerical reference 410 designates an aerial antenna; numerical reference 420 designates a transmitter; numerical reference 421 designates a magnetron; numerical reference 422 designates a modulator; numerical reference 431 designates a directional coupler; numerical reference 432 designates a circulator; and numerical reference 440 designates a signal processing unit. Numerical reference 441 designates a burst signal detector circuit including burst gate circuit 141, power comparing circuit 142, burst search circuit 143, and automatic frequency control (AFC) 144. Numerical reference 442 designates a trigger generating circuit; and numerical reference 450 designates a receiver including stable local oscillator 451 and mixer 452.

Next, operation will be described. A structure other than internal components of burst signal detector circuit 441 is the same as that in the conventional technique. In synchronism with a transmitting trigger outputted from trigger generating circuit 442, magnetron 421 oscillates by receiving electric current supplied from modulator 422. Thus generated transmitted pulse passes through directional coupler 431 and circulator 432 and emitted from aerial antenna 410. The transmitted pulse reflected by a target is again received by aerial antenna 410, passes through circulator 432, and becomes a received signal. On the other hand, a part of the pulse to be transmitted is taken out by directional coupler 431 and supplied to burst signal detector 441. Burst signal detector circuit 441 has burst gate circuit 141 for setting a burst gate controlled by burst search circuit 143. Burst gate circuit 141 according to the present invention is different from the conventional burst gate circuit 141 illustrated in FIG. 11 at a point that the position of burst gate is changeable in accordance with a control signal from an outside. The part of the pulse to be transmitted passes through the burst gate, and is inputted into power comparison circuit 142, wherein the transmission power of the part of the pulse in the burst gate is compared with a preset threshold value to determine whether or not the pulse is generated in the burst gate. The result of the determination is sent to burst search circuit 143. In burst search circuit 143, burst gate circuit 141 is controlled by burst search circuit 143 in accordance with the inputted signal so that a burst sampling position constantly follows a timing generated by the pulse to be transmitted.

Burst search circuit 143 sends a control signal in response to a deviation of timing with respect to the burst gate of the pulse to be transmitted to trigger generating circuit 442, and trigger generating circuit 442 controls the timing of trigger outputted to transmitter 420 and burst signal detector circuit 441 in accordance with the control signal inputted in trigger generating circuit 442.

In order to detect a movement of the burst signal, sampling is conducted to pick up a plurality of samples. In burst search circuit 143, a position of "range 0" is constantly checked by sampling the pulse to be transmitted to pick up the plurality of samples. Accordingly, even though a generating timing of the pulse varies, the circuit structure enables a constant control of the output timing of the trigger by trigger generating circuit 442 and a feedback to make a center of the pulse in "range 0".

Figure 2:
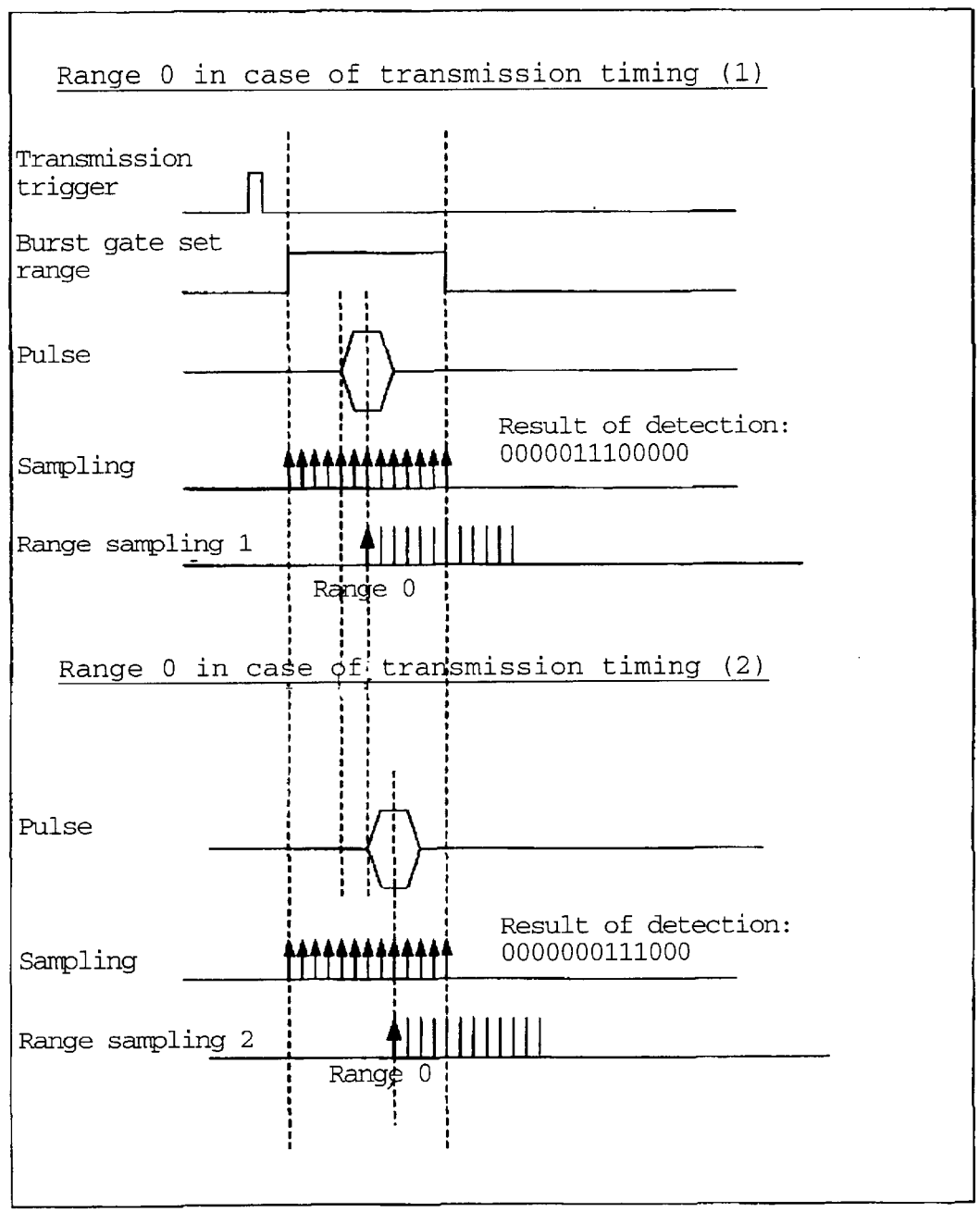
FIG. 2 is timing charts for showing how range zero (0) is detected by sampling a plurality of times.

In FIG. 2, a timing chart for detecting "range 0" using the plural samplings is shown. In order to set a start range, i.e. "range 0", of a process in the center of the pulse to be transmitted in the signal processing unit, as illustrated in the upper portion of FIG. 2, titled "range 0 in a case of transmission timing (1)", the range sampling is constantly started from a center of the pulse to be transmitted. Within a burst gate set range, sampling of the pulse is to pick up the plurality of samples, and a position where the pulse generates in the burst gate is checked based on a result of the sampling. In accordance with the result of the sampling, a trigger for starting the range sampling in correspondence with "range 0" is generated in trigger generating circuit 442. In "range 0 in a case of transmitting timing (2)" in the lower portion of FIG. 2, an example that the position of generating the pulse is different is shown. Also in this example, an operation similar to the above is conducted.

Further, a control system of the burst gate and a feedback loop of the control system of the trigger in trigger generating circuit 442 are constantly controlled so that tracking function works. Simultaneously, the pulse to be transmitted passing through the burst gate circuit is inputted in AFC circuit 144 to control the frequency from magnetron 421 and the frequency from stable local oscillator 451 for downloading and converting the received signal by detecting the frequency and the phase. The received signal and the output from stable local oscillator 451 are mixed by mixer 452 and thereafter phase is detected in the signal processing unit.

Accordingly, if a timing of oscillation of the pulse to be transmitted rests within the burst gate, set in burst gate circuit 141, the above feedback loop is constantly controlled, and the pulse is constantly tracked, whereby the doppler radar device can be stably used independent from the timing of oscillation of the pulse to be transmitted.

Figure 3:
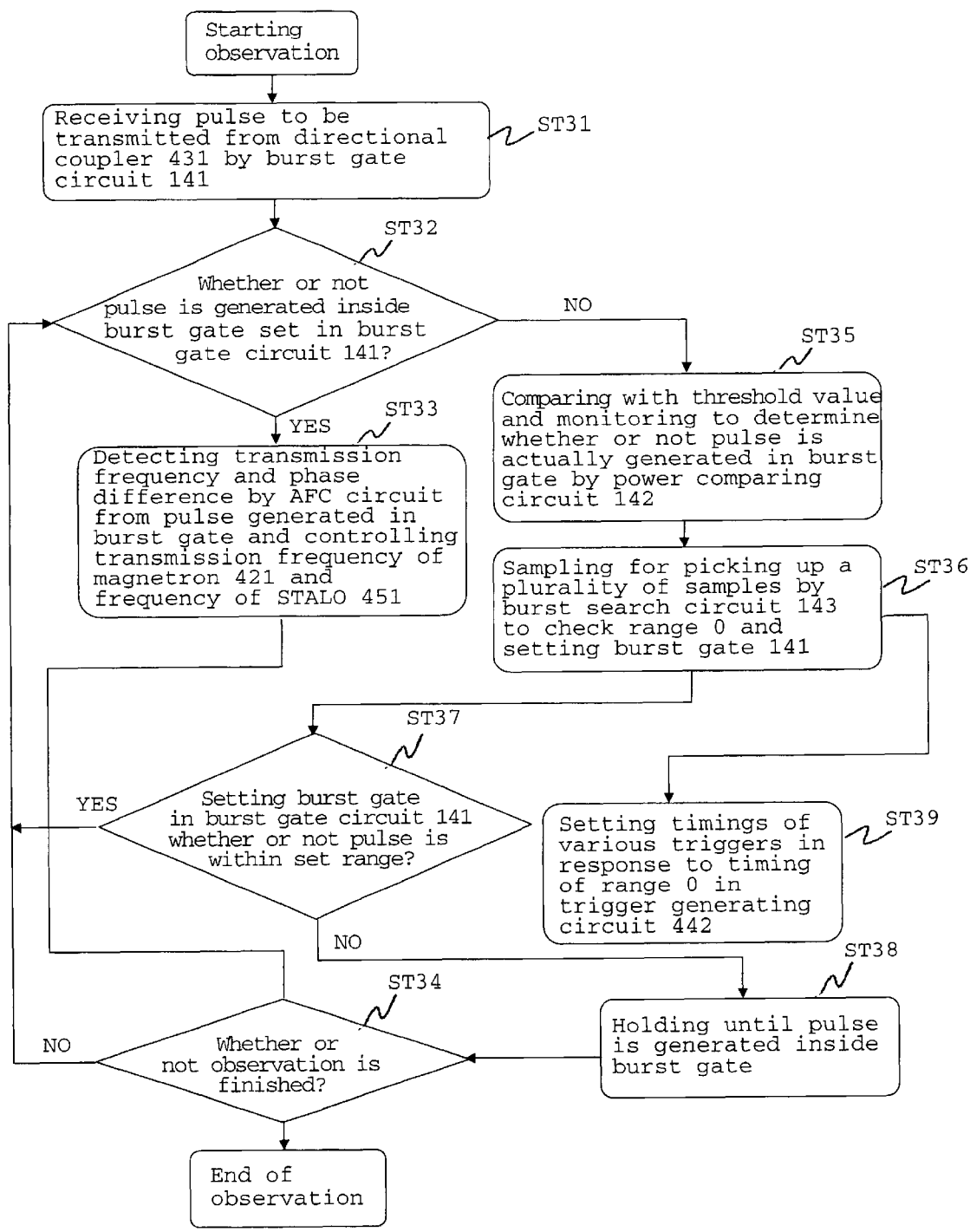
FIG. 3 is a flow diagram for illustrating control according to Embodiment 1 of the present invention.

FIG. 3 is the control flow chart according to Embodiment 1 of the present invention. In FIG. 3, the control flow according to Embodiment 1, illustrated in the block chart of FIG. 1, is explained. When the pulse to be transmitted is generated within the burst gate and transmitted at a normal timing, the operation follows a flow of Steps 31 through 34, which are the same as Steps 121 through 124 in FIG. 12. When the pulse to be transmitted is not generated in the burst gate, the level of the pulse is compared with a threshold value in the power comparing circuit and the pulse is monitored in Step 35. As a result, a feedback loop of tracking the pulse within the burst gate set range is formed from burst search circuit 143 to burst gate 141 in Steps 36 and 37. When the feedback loop normally operates, the frequency control by AFC circuit 144 and various timings by trigger generating circuit 442 are normally controlled to enable normal observation in Steps 32 and 33. In Step 39, the various trigger timings are set in trigger generating circuit 442.

When the pulse to be transmitted is generated outside the burst gate set range in response to the control by burst search circuit 143, the process is held on until the pulse is generated within the burst gate set range in Steps 37 and 38. When the pulse is generated within the burst gate set range, the above-mentioned feedback loop is formed and observation is normally started in Steps 32 and 33.

Figure 4:
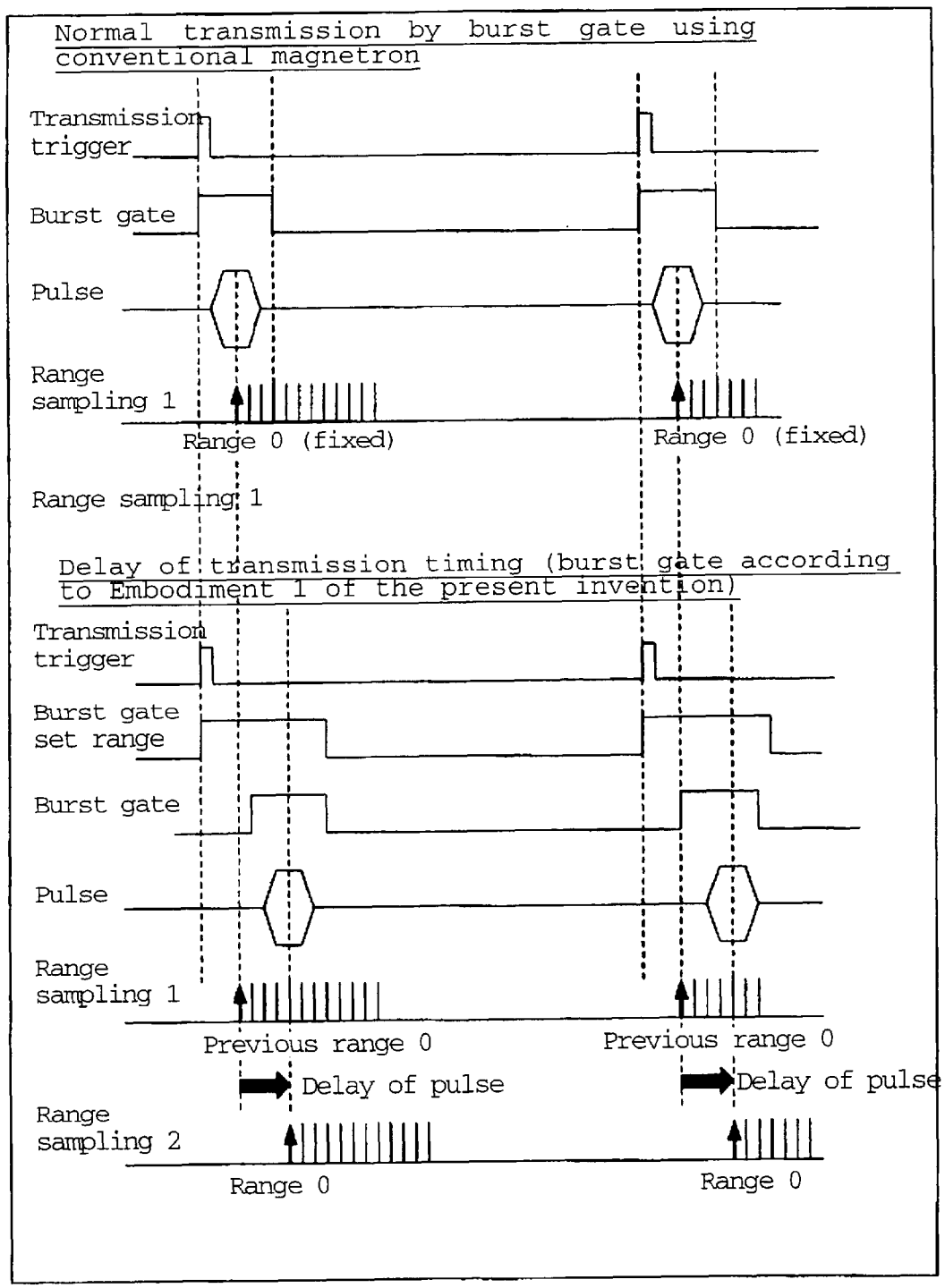
FIG. 4 is timing charts for explaining Embodiment 1 of the present invention.

FIG. 4 is a timing chart according to Embodiment 1 of the present invention. In FIG. 4, the timing chart according to Embodiment 1 shown in the block diagram of FIG. 1 and the control flow chart in FIG. 3 is illustrated. The pulse to be transmitted in the normal state is illustrated in the upper portion of FIG. 4. The pulse in the normal state is generated within the burst gate, and range sampling by trigger generating circuit 442 is generated in a center of the pulse to be transmitted, wherein "range 0" is normally set. However, in a case of the burst gate using the conventional magnetron, "range 0" is fixed against setting of the burst gate, whereby "range 0" does not respond to a delay of the pulse and observation is not normally done.

In the lower portion of FIG. 4, when the pulse to be transmitted is within the burst gate set range, burst gate 141 receives the feedback from burst search circuit 143 to change the position of the burst gate. Trigger generating circuit 442 outputs a range sampling to a position where the pulse is generated to start a normal observation. However, in a case where the pulse to be transmitted eludes the burst gate set range, the process is held on until the pulse is generated within the burst gate set range. When the pulse is within the burst gate set range, observation is normally started using the above-mentioned feedback loop.

Embodiment 2

Figure 5:
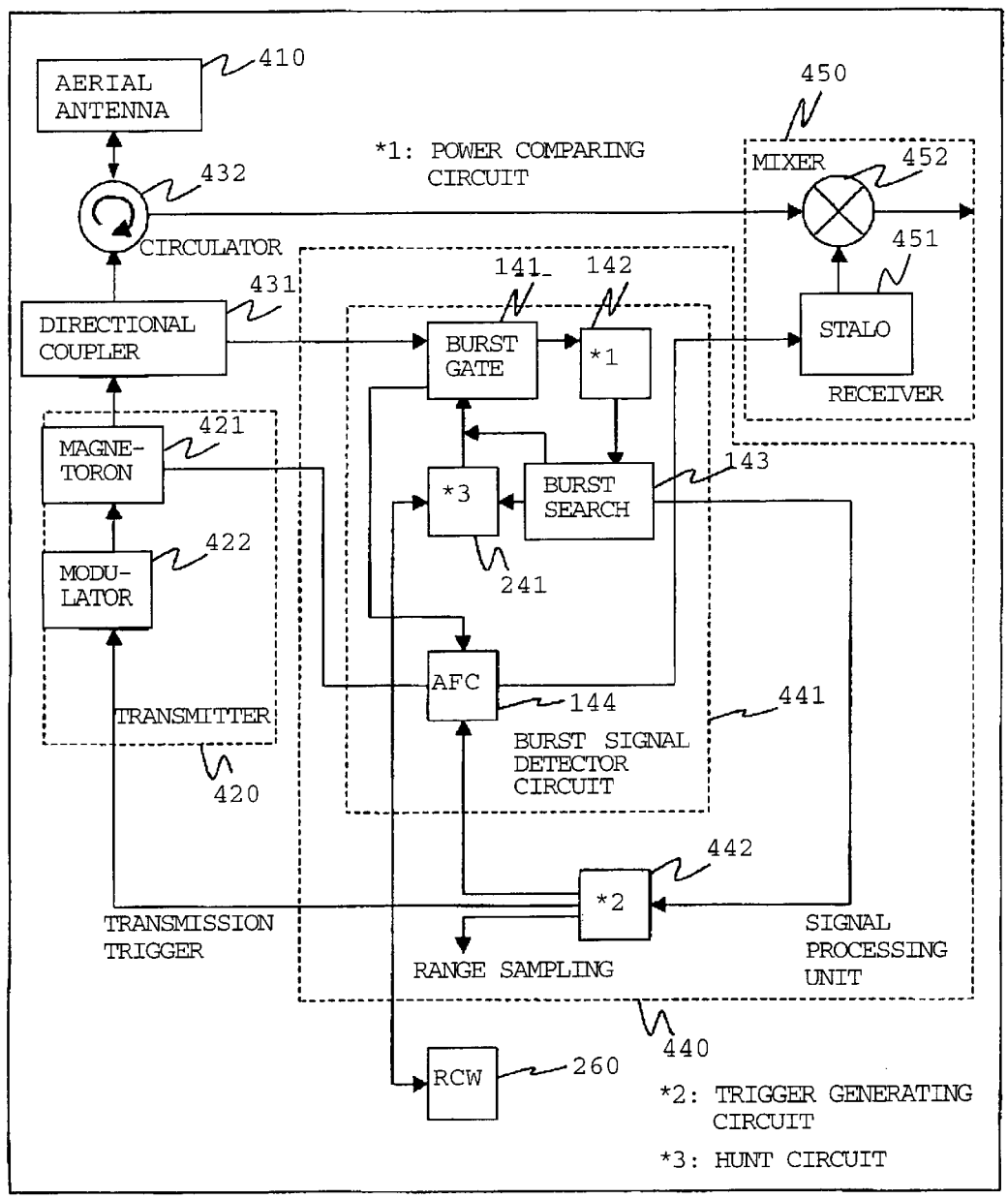
FIG. 5 is a block diagram for illustrating Embodiment 2 of the present invention.

Hereinbelow, Embodiment 2 will be described in reference of the figures. In FIG. 5, numerical reference 410 designates an aerial antenna; numerical reference 420 designates a transmitter; numerical reference 421 designates a magnetron; numerical reference 422 designates a modulator; numerical reference 431 designates a directional coupler; numerical reference 432 designates a circulator; numerical reference 440 designates a signal processing unit; and numerical reference 441 designates a burst signal detector circuit including burst gate circuit 141, power comparing circuit 142, burst search circuit 143, HUNT circuit 241 and automatic frequency control (AFC) 144. Numerical reference 442 designates a trigger generating circuit; and numerical reference 450 designates a receiver including stable local oscillator 451 and mixer 452. Numerical reference 260 designates radar control workstation (RCW).

Next, its operation will be described. HUNT circuit 241 and RCW 260 are added to the structure described in Embodiment 1. HUNT circuit 241 is manually or automatically switchable by RCW 260. The automatic switching is ordinarily set. Hereinbelow, a case where the automatic switching is selected will be described. When the pulse to be transmitted is oscillated at a timing largely eluding a range of a burst gate set in a burst gate circuit 141 because of a certain combination of modulator 422 and magnetron 421, tracking can not be effected by the feedback loop described in Embodiment 1.

When burst search circuit 143 becomes unable to track a timing of oscillating the pulse to be transmitted, HUNT circuit 241 is automatically started up. HUNT circuit 241 forcibly outputs a control of sweeping the burst gate to burst gate circuit 141 in order to find the timing of oscillating the pulse to be transmitted and searches the timing of oscillating the pulse. When the timing of oscillating the pulse is successfully searched by HUNT circuit 241, the timing of oscillating the pulse is tracked by the feedback loop described in Embodiment 1.

Further, the output signal from trigger generating circuit 442 is constantly feed-backed while searching the timing of oscillating the pulse to be transmitted, wherein even in a case where the timing of oscillating the pulse eludes an ordinary burst gate, a center of the pulse to be transmitted is in "range 0". In a manner similar thereto, the feedback loop by AFC 144 constantly functions to constantly control the frequency.

Next, a case where the manual switching is selected will be described. When the pulse to be transmitted is oscillated at a timing that the timing of oscillating the pulse largely eludes the range of the burst gate set in burst gate circuit 141, HUNT circuit 241 is forcibly started up by an external control by RCW 260. An operation the same as that in the case of the automatic switching is attained by the external control signal. In the case of the manual switching, the feedback loop by trigger generating circuit 442 and AFC 144 functions as in the case of the automatic switching, "range 0" is maintained by controlling the trigger output by trigger generating circuit 442, and the frequency control by AFC 144 is constantly realized.

Accordingly, even though the manual switching is changed to the automatic switching or the automatic switching is changed to the manual switching, the changes are done without delay of time and problems. As described, even though the timing of oscillating the pulse to be transmitted is in a range eluding the burst gate set in burst gate circuit 141, the pulse is constantly tracked by the operation of HUNT circuit 241, whereby the device according to Embodiment 2 can be stably applied regardless of the timing of oscillating the pulse.

Figure 6:
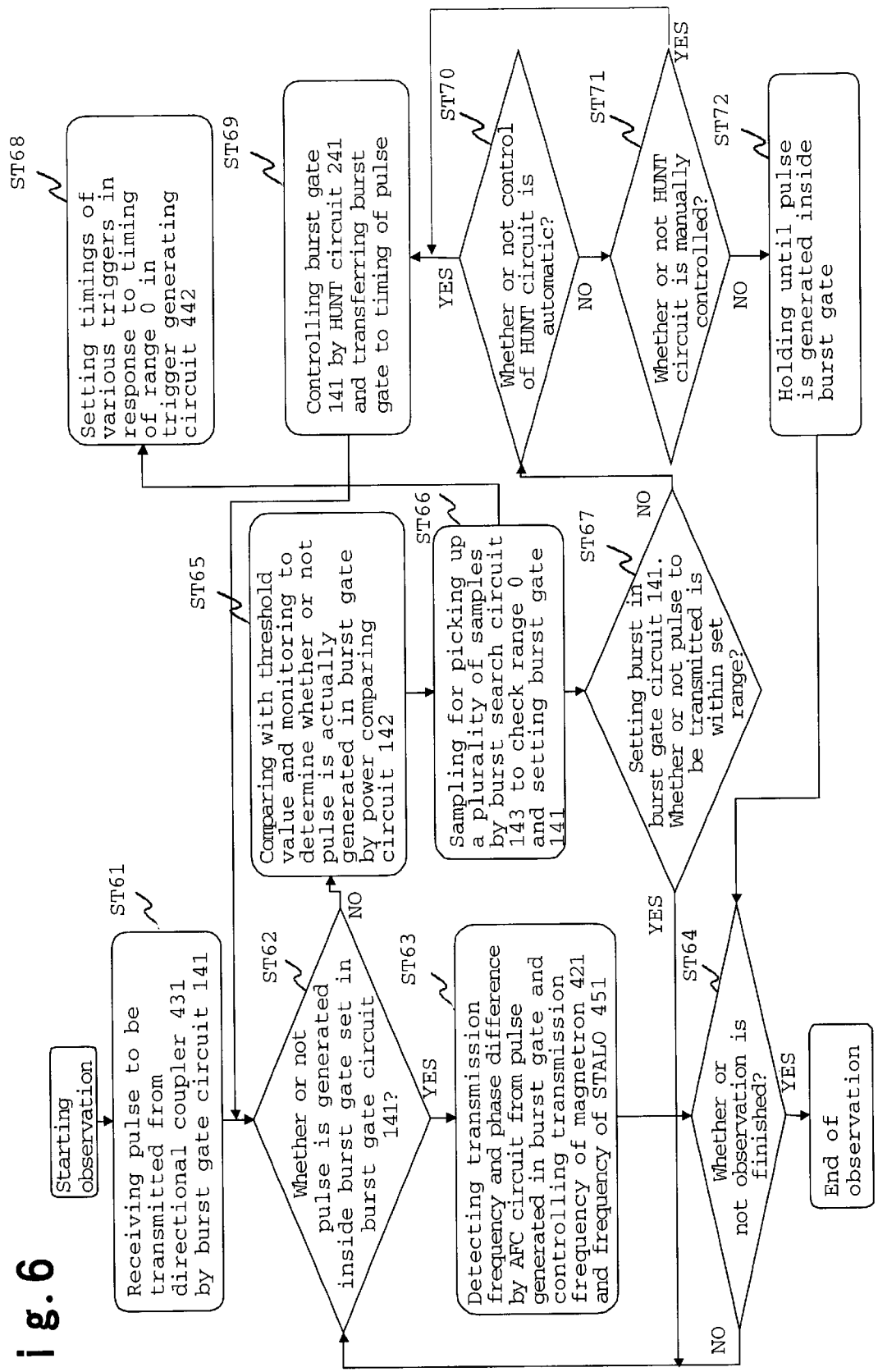
FIG. 6 is a flow diagram for showing control in Embodiment 2 of the present invention.

FIG. 6 is a control flow chart according to Embodiment 2 of the present invention, wherein the control flow according to Embodiment 2 illustrated in the block diagram in FIG. 5 is shown. Operation in a case where the pulse to be transmitted is generated within the burst gate and transmitted at a normal timing follows flow of Steps 61 through 64, which are the same as Steps 31 through 34 in FIG. 3. In a case where the pulse to be transmitted is generated outside the burst gate set range, the level of the pulse is compared with a threshold value by power comparing circuit 142, and the pulse is monitored in Step 65. As a result, burst search circuit 143 controls HUNT circuit 241, and HUNT circuit 241 transfers burst gate 141 to a position where the pulse is generated regardless of the burst gate set range in Steps 66, 70 and 69. In Steps 66 and 67, a feedback loop is formed by power comparing circuit 142 and the burst search circuit to check whether or not the pulse to be transmitted is actually generated at the transferred position and simultaneously make the burst gate track the pulse.

HUNT circuit has automatic and manual generation modes. In a case of the manual mode, it is possible to select whether or not HUNT 241 is operated by turning on or off in Step 71. When the HUNT circuit is effective, the burst gate tracks the position of the pulse to be transmitted and the timing of "range 0" becomes constantly normal upon starting of observation in Step 69. Therefore, it is unnecessary to hold the process until the pulse is generated in the burst gate. However, when the pulse eludes the burst gate set range in the case of the manual mode of HUNT circuit, the process is held until the pulse is generated within the burst gate set range in Steps 71 and 72. Meanwhile, HUNT circuit 241 can forcibly start up in the manual mode.

Further, when the pulse to be transmitted is generated outside the burst gate set range, in a case where HUNT circuit 241 normally operates in Steps 70 and 69, the above-described feedback loop is formed, a frequency control by AFC circuit 144 and various timings by trigger generating circuit 442 normally work, and "range 0" is constantly tracked, whereby observation can be normally performed in Steps 62 and 63.

Figure 7:
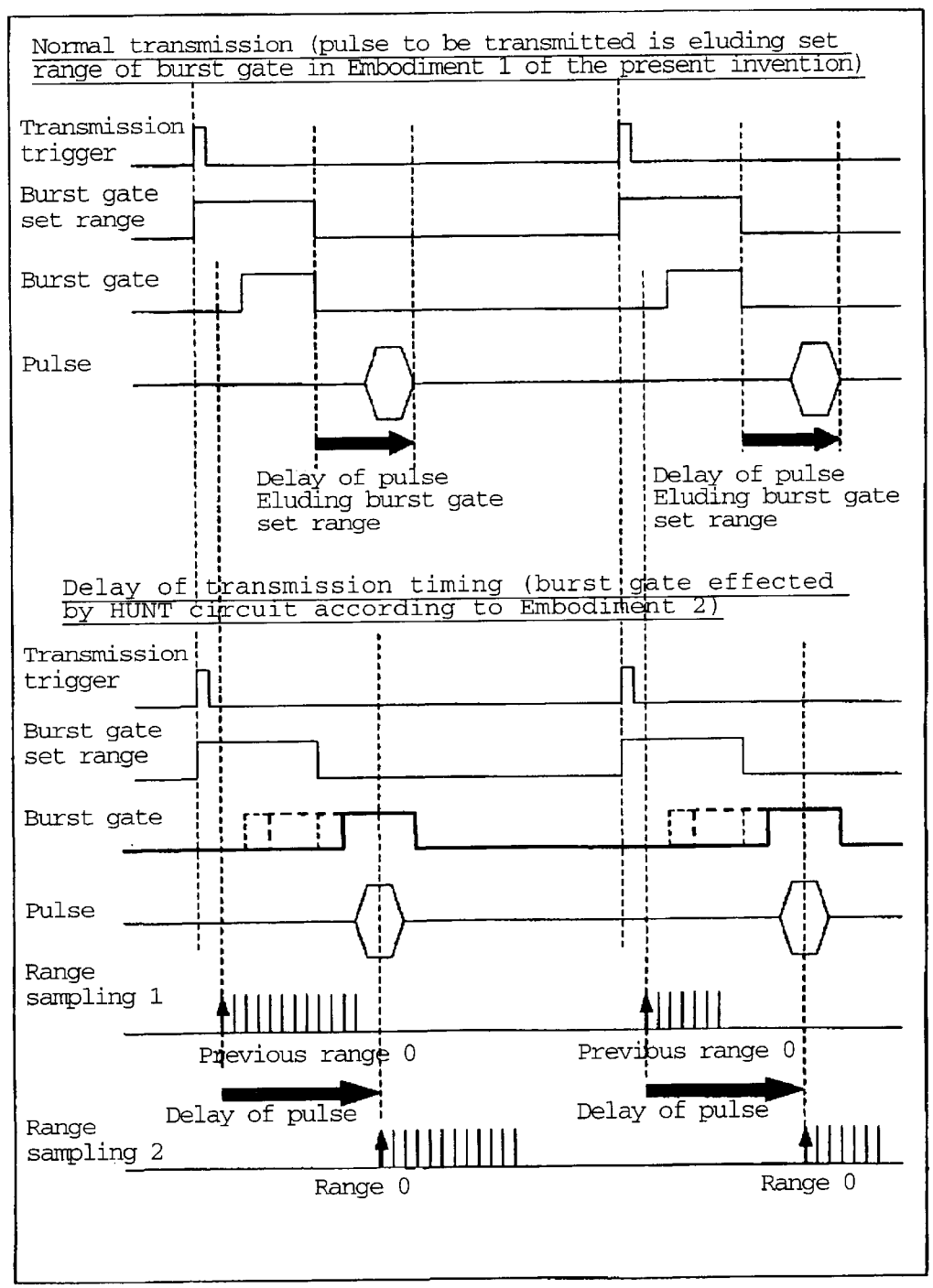
FIG. 7 is timing charts for explaining Embodiment 2 of the present invention.

FIG. 7 is a timing chart according to Embodiment 2 of the present invention, which timing chart corresponds to the block diagram in FIG. 5 and the control flow chart in FIG. 6. The pulse to be transmitted is generated inside the burst gate in the normal state, and the range sampling from trigger generating circuit 442 is generated in the center of the pulse to be transmitted, whereby "range 0" is normally set. In Embodiment 1, burst gate 141 is feed-backed by burst search circuit 143 when the pulse is within the burst gate set range, and the range sampling is outputted from trigger generating circuit 442 to the position where the pulse is generated by the control by the burst search circuit, whereby observation can be normally started.

Further, when the pulse to be transmitted eludes the burst gate set range, it is necessary to hold the process until the pulse is generated within the burst gate set range as in the upper portion of FIG. 7. Accordingly, the burst gate is transferred to the timing where the pulse is generated by the control by HUNT circuit 241, the pulse is tracked to be controlled so that the position of "range 0" starts at the timing where the pulse is generated as in the lower portion of FIG. 7.

Embodiment 3

Figure 8:
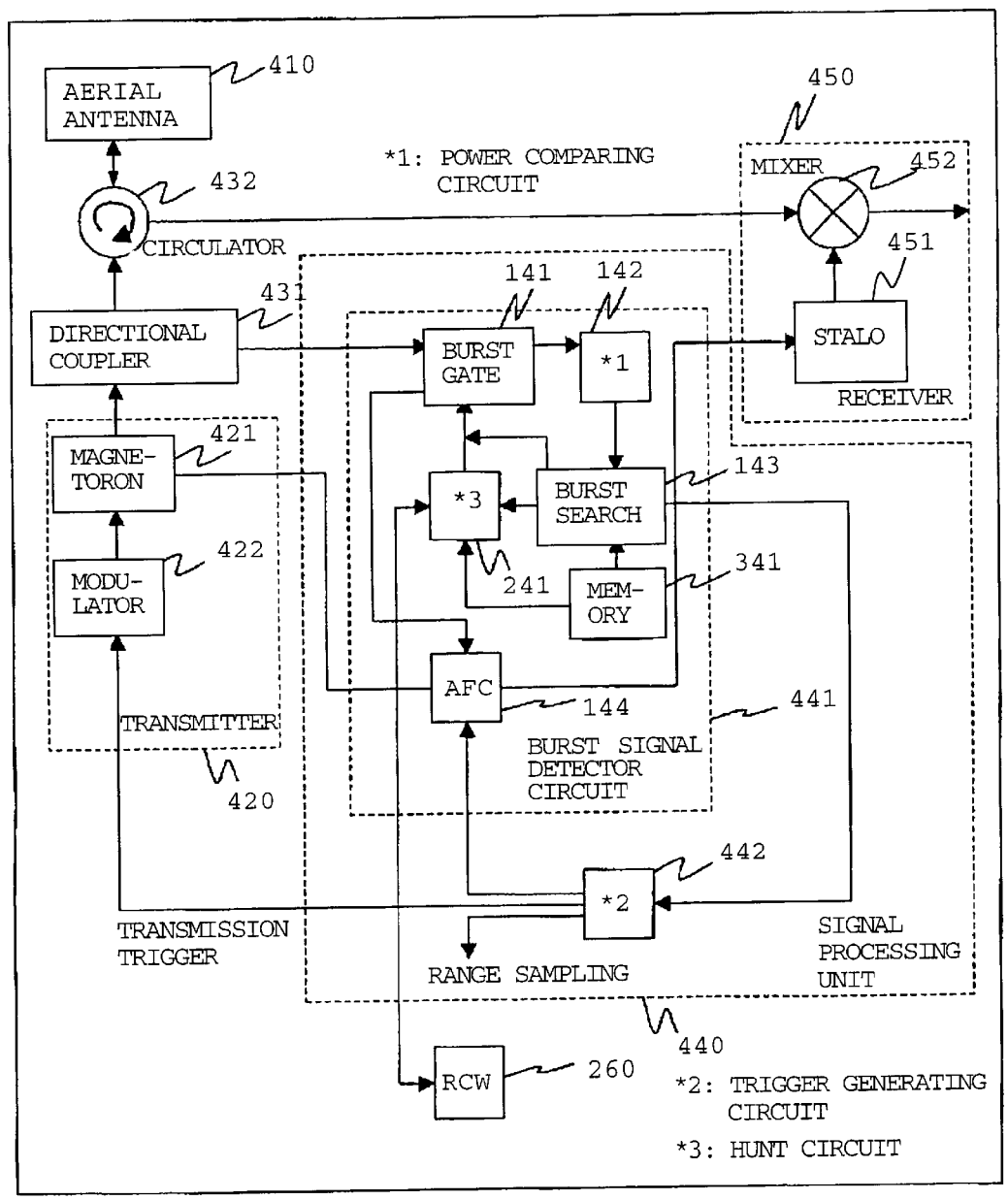
FIG. 8 is a block diagram for illustrating Embodiment 3 of the present invention.

Hereinbelow, Embodiment 3 of the present invention will be described in reference of the figures. In FIG. 8, numerical reference 410 designates an aerial antenna; numerical reference 420 designates a transmitter; numerical reference 421 designates a magnetron; numerical reference 422 designates a modulator; numerical reference 431 designates a directional coupler; numerical reference 432 designates a circulator; and numerical reference 440 designates a signal processing unit. Numerical reference 441 designates a burst signal detector circuit including a burst gate circuit 141, power comparing circuit 142, burst search circuit 143, HUNT circuit 241, automatic frequency control (AFC) 144, and memory 341; numerical reference 442 designates a trigger generating circuit; numerical reference 450 designates a receiver; numerical reference 451 designates a stable local oscillator; numerical reference 452 designates a mixer; and numerical reference 260 designates RCW.

Next, its operation will be described. The structure other than burst signal detector circuit 441 is the same as that in Embodiment 2. In comparison with Embodiment 2, memory 341 is included in burst signal detector circuit 441. When it is predicted that a pulse to be transmitted is outputted at a timing largely eluding a range of burst gate, set in burst gate circuit 141, because of a certain combination of modulator 422 and magnetron 421, a tracking may require a substantial time in use of the feedback loop according to Embodiment 2. A time for transferring the burst gate is memorized in memory 341 in advance, and burst gate circuit 141 is controlled through HUNT circuit 241 using information in memory 341 as an initial set value when power is thrown in, whereby the burst gate can be transferred in advance, it becomes unnecessary to search the burst gate, and a tracking time is shortened in comparison with Embodiment 2.

Further, the initial set value in memory 341 is set in burst search circuit 143, and thus set initial set value becomes a control signal for trigger generating circuit 442. An output signal from trigger generating circuit 442 is outputted in response to the initial set value. After an initial setting of trigger generating circuit 442 is completed, the circuit is formed to feed back to bring a center of the pulse to be transmitted to "range 0". Therefore, the operation is like that in Embodiment 2. In a similar manner thereto, the initial set value in memory 341 is set in burst search circuit 143 and immediately thereafter constantly control a frequency by AFC 144.

Accordingly, after the initial setting, a feedback loop operates to track burst in accordance with the controls described in Embodiment 1 and 2. When the pulse to be transmitted is tracked by the burst gate, the pulse to be transmitted is constantly tracked, whereby the device according to Embodiment 3 can be stably applied regardless of a timing of oscillating the pulse.

Figure 9:
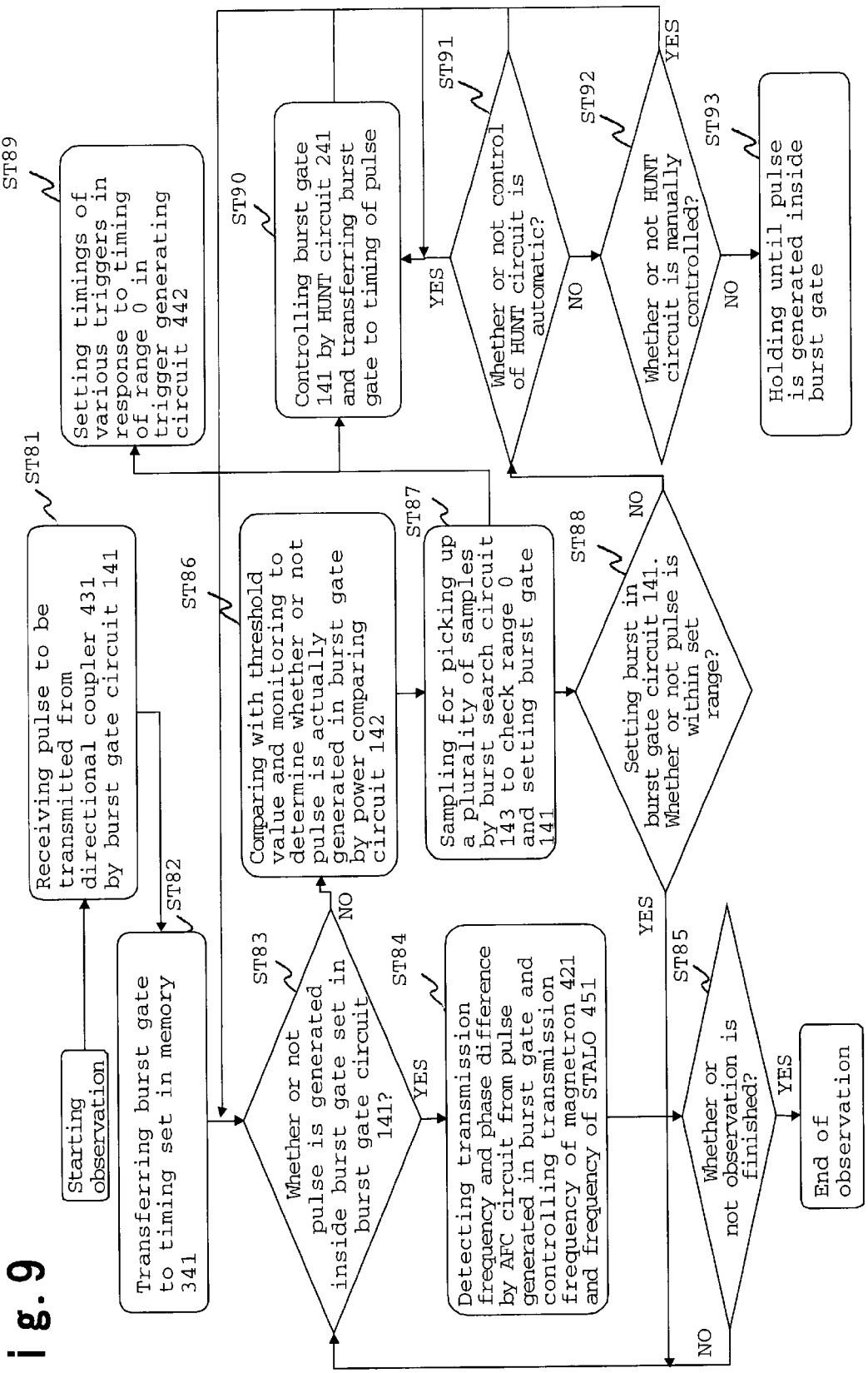
FIG. 9 is a flow chart for explaining control in Embodiment 3 of the present invention.

FIG. 9 is a control flow chart according to Embodiment 3 of the present invention, wherein the control flow according to Embodiment 3 described in the block chart in FIG. 8 is shown. In comparison with Embodiment 2, a function by memory 341 is added. Before starting observation, a time of delaying the pulse to be transmitted is set in the memory in advance, and the burst gate is transferred to a position where the pulse is predicted to generate at a time of throwing a power source in a system in Step 90. Thereafter, observation is normally performed by a control in the feedback loop controlled by HUNT circuit 241.

Figure 10:
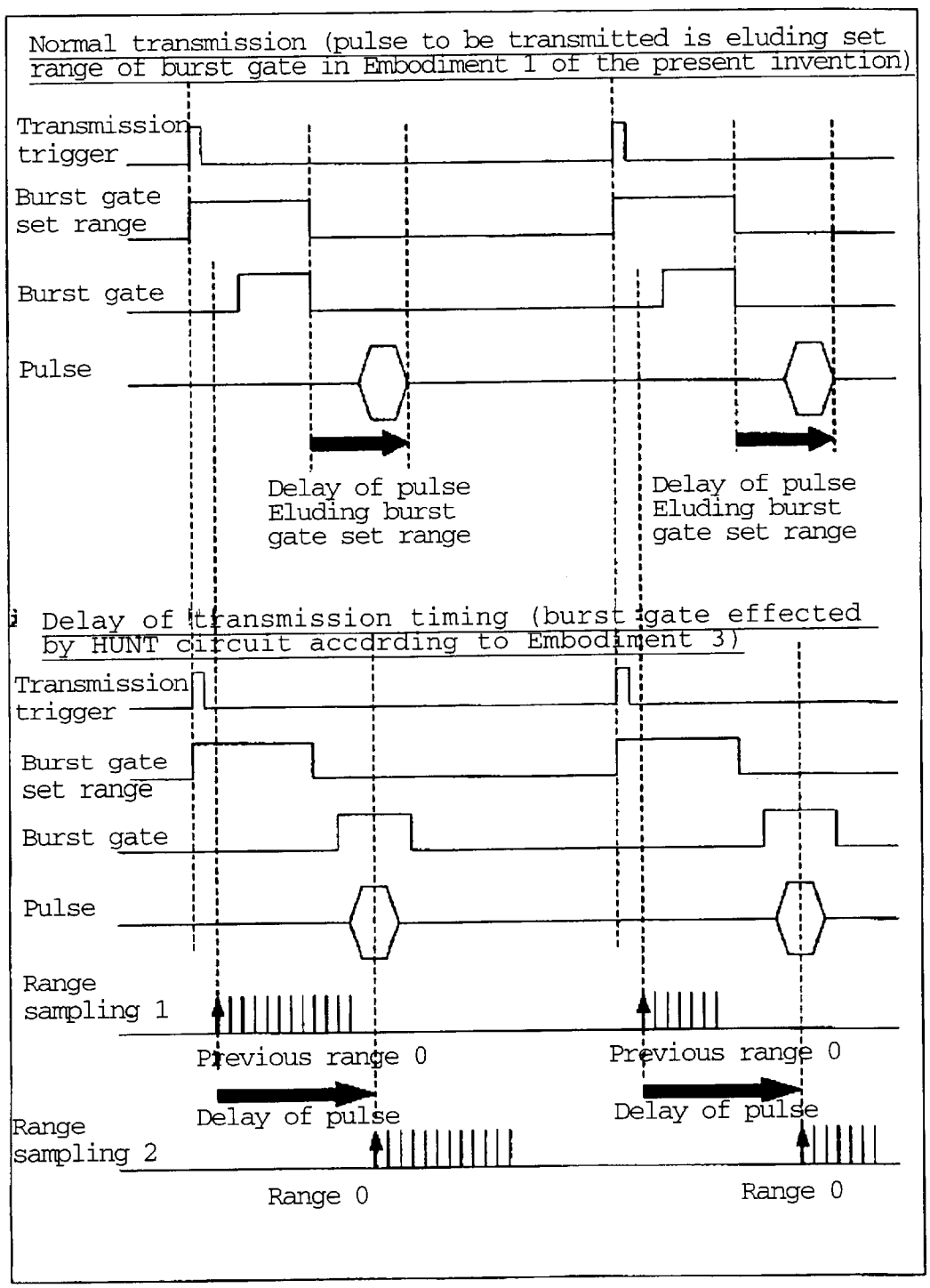
FIG. 10 is timing charts for explaining Embodiment 3 of the present invention.
Figure 11:
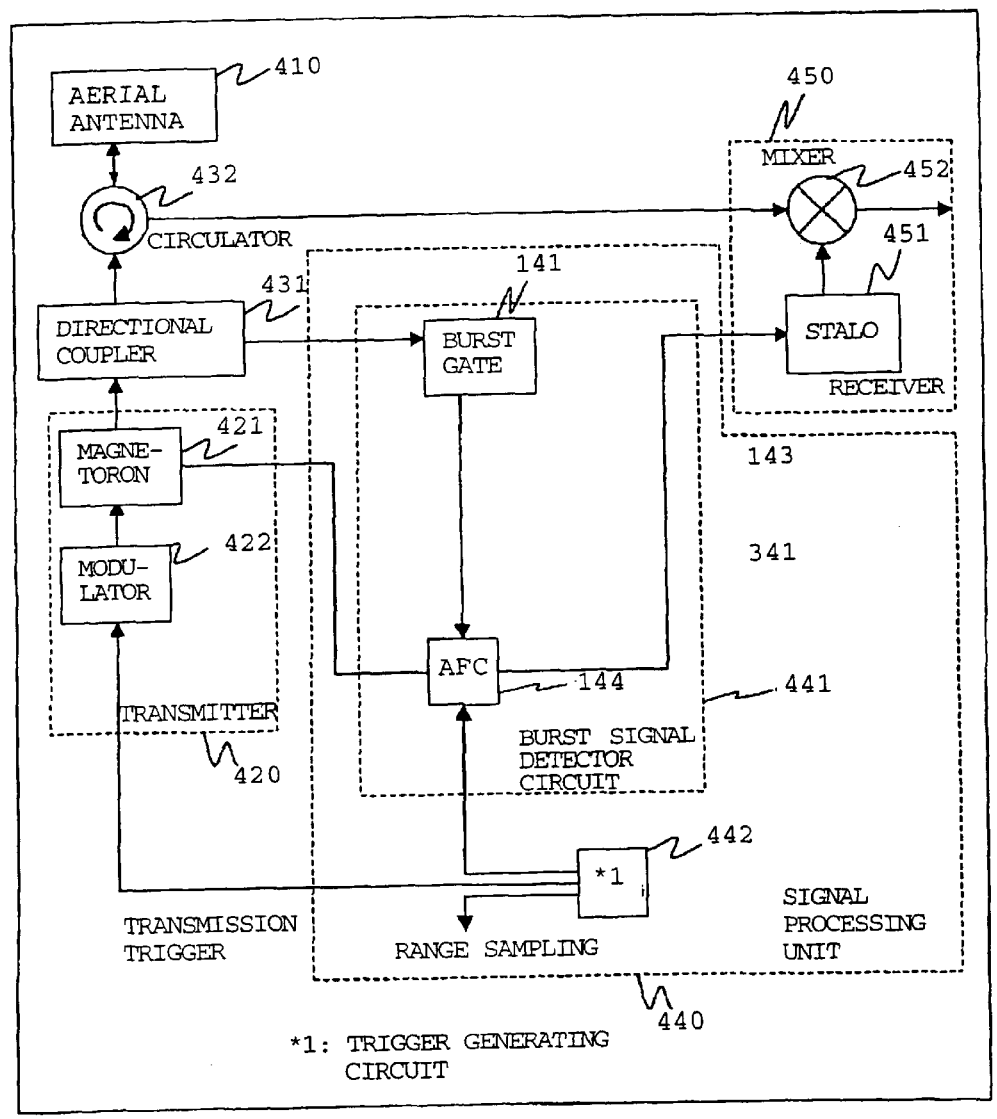
FIG. 11 is a block diagram for illustrating a meteorological doppler radar device having the conventional magnetron.
Figure 12:
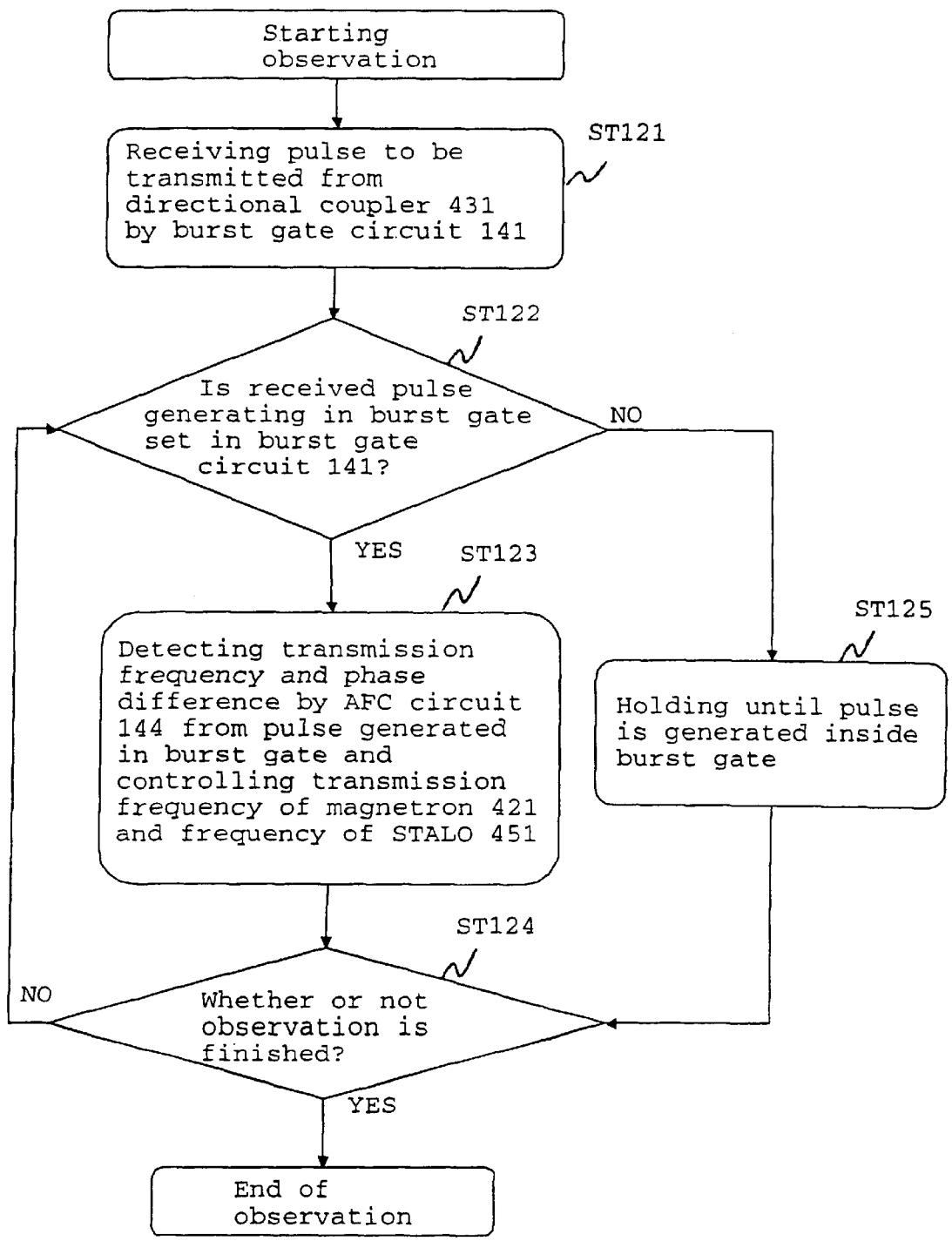
FIG. 12 is a flow chart for controlling a meteorological doppler radar device having the conventional magnetron, wherein STALO means a stable local oscillator.

FIG. 10 is a timing chart according to Embodiment 3 of the present invention, wherein the timing chart corresponds to the block chart in FIG. 8 and the control flow chart in FIG. 9. When the pulse to be transmitted eludes a pulse gate set range, the burst gate is transferred to a timing where the pulse is generated by the control by HUNT circuit 241, whereby the pulse is tracked, and a position of "range 0" is controlled by the feedback loop so as to start the timing when the pulse generates. However, a substantial time may be required to transfer the burst gate by HUNT circuit 241. Therefore, when a timing of delaying the pulse to be transmitted is predictable at a time of starting observation, a delay time is set in the memory to set the set position of the burst gate in accordance with the delay time set in the memory before starting the control by HUNT circuit, and observation is normally done by the control by the feedback loop using HUNT circuit 241. As in the lower portion in FIG. 10, observation can be done at a time of starting up the system without delay.

Obviously, numerous modifications and variations of the present invention are possible in light of the above teachings. It is therefore to be understood that within the scope of the appended claims, the invention may be practiced otherwise than as specifically described herein.

The entire disclosure of Japanese Patent Application No. 2002-066920 filed on Mar. 12, 2002 including specification, claims, drawings and summary are incorporated herein by reference in its entirety.

What is claimed is:

1. A doppler radar device comprising:

a transmitter for generating a pulse signal to be transmitted;

a coupling means for dividing the pulse signal and outputting a part of the pulse signal;

a gate means for extracting the outputted part of the pulse signal by filtering through a gate having a predetermined time period;

a comparing means for comparing the level of the pulse signal extracted through the gate with a predetermined threshold value; and a searching means for changing a set position of the gate in the gate means based on the result of the comparison.

2. The doppler radar device according to claim 1, wherein the transmitted pulse signal is sampled within the predetermined time period in the gate, and a position of the transmitted pulse signal is calculated using the sampling data.

3. The doppler radar device according to claim 1, wherein a predetermined gate set range is provided in the searching means, and the set position of the gate is changed within the predetermined gate set range.

4. The doppler radar device according to claim 2, wherein the transmitted pulse signal is tracked using a plurality of sampling data obtained in the searching means.

5. The doppler radar device according to claim 2, wherein an HUNT circuit for manually or automatically moving the set position of the gate outside the predetermined gate set range.

6. The doppler radar device according to claim 5, wherein the gate is moved to a gate transfer position, registered in advance, by the HUNT circuit.

* * * * *